United States Patent

[11] 3,601,400

| | | |
|---|---|---|
| [72] | Inventor | Patrick W. Boles<br>3708 E. 38th St., Anderson, Ind. 46013 |
| [21] | Appl. No. | 16,296 |
| [22] | Filed | Mar. 4, 1970 |
| [45] | Patented | Aug. 24, 1971 |

[54] STEERABLE SLOT CAR MEANS
9 Claims, 6 Drawing Figs.

| | | |
|---|---|---|
| [52] | U.S. Cl. | 273/86 B,<br>46/244 A |
| [51] | Int. Cl. | A63h 17/36 |
| [50] | Field of Search | 46/243, 244<br>R, 244 B; 273/86 B |

[56] References Cited
UNITED STATES PATENTS

| 3,239,963 | 3/1966 | Smith et al. | 273/86 B X |
|---|---|---|---|
| 3,239,962 | 3/1966 | Toteff et al. | 46/244 R |
| 3,339,307 | 9/1967 | Floyd et al. | 46/244 R |
| 3,432,166 | 3/1969 | Goldfarb | 273/86 B |

Primary Examiner—Louis G. Mancene
Assistant Examiner—Robert F. Cutting
Attorney—Robert A. Spray ABSTRACT: A steerable slot car installation, the cars being steerable by remote control so as to be able to move laterally from the nominal pathway of the track, the steering control being electrically operable through conductors extending from the car to the electrically energized track.

PATRICK W. BOLES,
INVENTOR
BY Robert A. Spray
ATTORNEY

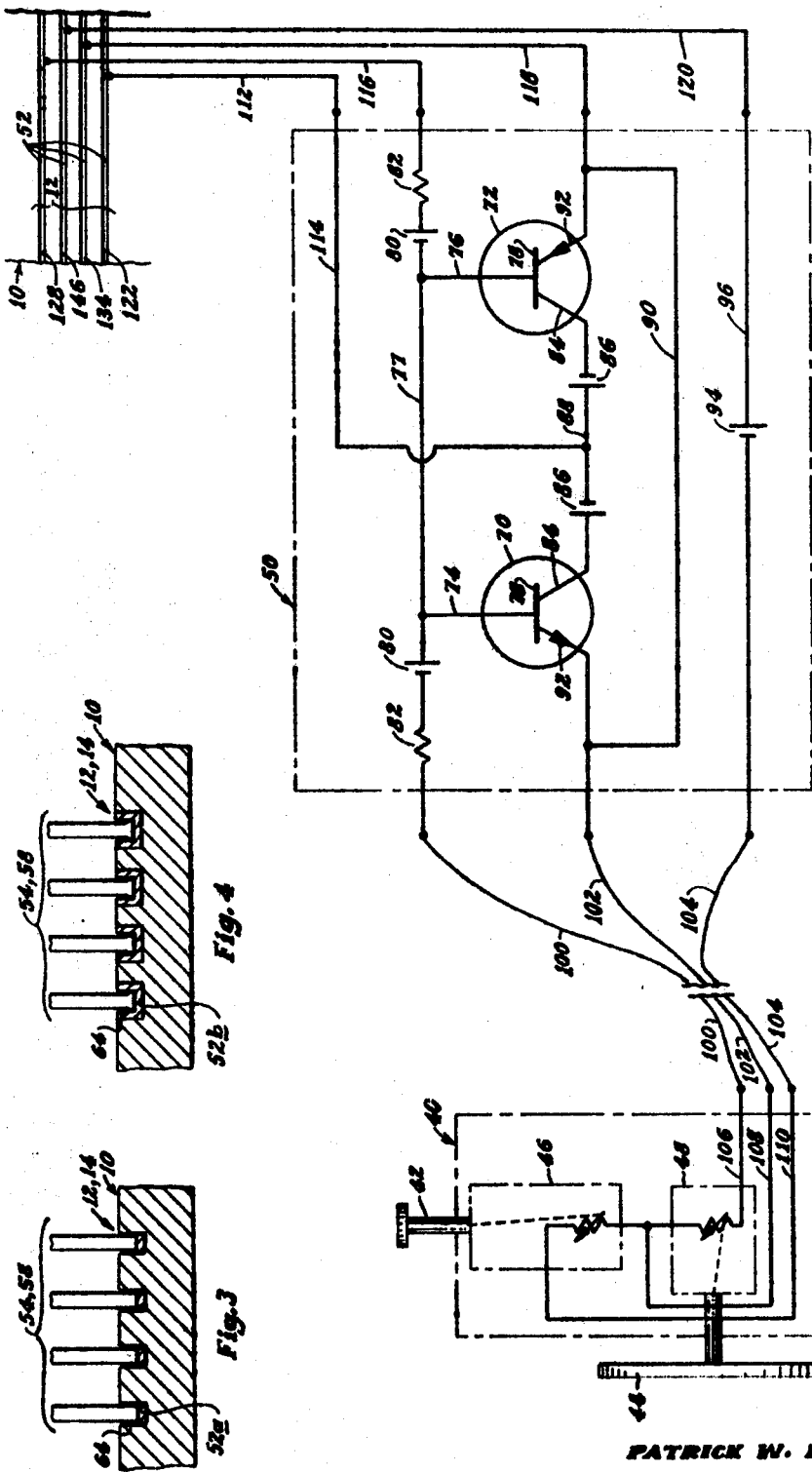

STEERABLE SLOT CAR MEANS

This invention relates to slot cars or other small vehicles of an installation, generally considered as for indoor amusement use; and concepts of the invention provide that the cars are steerable, by remote control, and each of the cars of the installation are separately or individually steerable.

More particularly, the inventive concepts provide a steering control means or system, by which the steering control is by conductors extending from the cars and engaging an electrically powered or energized trackway to which is also connected a control circuitry by which, by remote control, the operator of each of the cars can steer his car laterally of the trackway although generally along the trackway.

The concepts of the invention thus provide a steerable slot car means, providing high appeal and interest, permitting, for example, the racing of such slot cars to require a special technique of passing a car by steering the passing car laterally of the track in an outwardly swinging movement to clear the car being passed, and requiring a car to be steered or swung laterally of the track to avoid obstacles, etc.

The steerability may be, and desirably is, incorporated in a slot car installation also having speed control of the individual cars. However, considerable added pleasure and excitement is attained by the present concepts of steerability, and by the operational requirement of the user properly steering his car, in contrast to other race car installations in which only speed control is achieved.

The concepts provide an installation which not only adds the appeal and interest mentioned above, but which also is relatively inexpensive, reliable, and has compactness particularly of components carried in the vehicle.

The above description is somewhat introductory and generalized; more details as to the features, concepts, and operation of the steerable slot car control means is set forth in the following, more detailed, description of a specific embodiment which illustrates the inventive concepts, taken in conjunction with the accompanying somewhat diagrammatic and schematic illustrative drawings, in which.

Figures 1, 2:
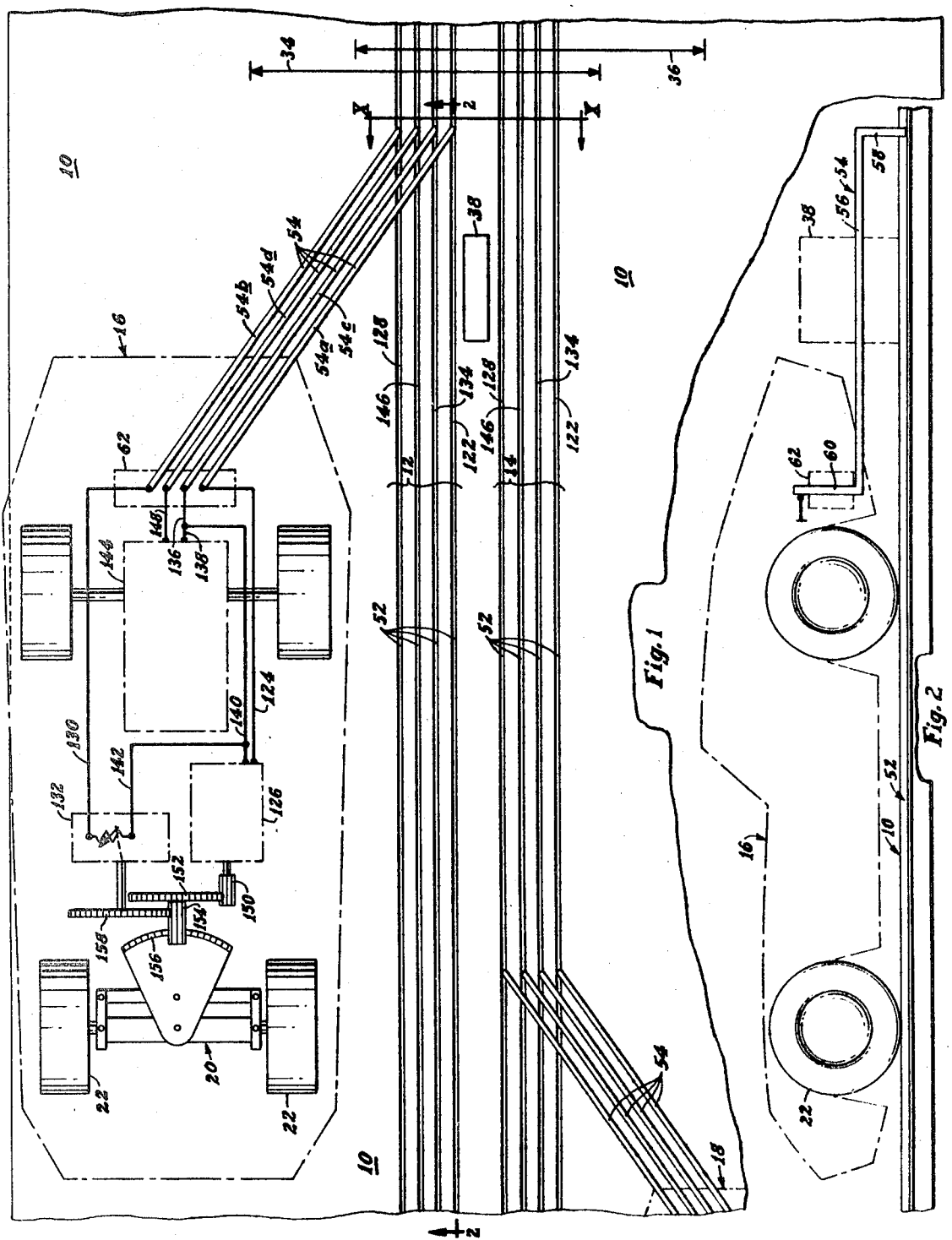
FIG. 1 is a plan view of a portion of a trackway of a steerable slot car installation, showing the tracks for a two-car setup or arrangement, providing separate control for each of the cars as to both steering direction and vehicle speed, and illustrating the control and drive components, both electrical and mechanical, of one of the steerable cars.
FIG. 2 is a vertical cross-sectional view of the installation shown in FIG. 1, FIG. 2 being taken generally as indicated by view line 2—2 of FIG. 1.

FIGS. 3 and 4 are transverse or lateral cross-sectional details, taken generally as indicated by view line X—X of FIG. 1, although in larger scale, and illustrating two embodiments of trackways; FIG. 5 is a schematic view of a remote control unit for one of the cars, by which both speed control and steering control is manually achieved by the operator of that particular car; and FIG. 6 is a schematic view of the corresponding "power box" or control circuitry which is interconnected to the control unit shown in FIG. 5 and to the trackway for the particular car being controlled by that control unit, thus controlling the energization of that particular car's trackway, and enabling the car as in FIG. 1 to sense or respond to that control and be controlled thereby, both as to speed and as to steering control.

As shown in the drawings, a track section 10 is shown as provided with two sets of control trackways 12 and 14, respectively, for controlling speed and steering control of two steerable slot cars 16 and 18. The mechanical steering apparatus of each of the cars is illustratively shown by the steering linkage and control generally designated by reference numeral 20, in car 16, the front wheels 22 being thus steerable to steer the car.

Concepts of the invention provide for separate or individual steerability of each of the cars 16 and 18, enabling the operator of each car to cause the car, by remote control means, to be steered laterally of the nominal pathway designated by the trackway 12 or 14 as the case may be.

The steerability of each car 16—18 advantageously permits its lateral maneuverability, from their respective nominal or track-centered positions indicated (FIG. 1) by dimensional arrows 34 and 36 respectively, to swing outwardly such as to the side position of the cars as indicated in FIG. 1, or to avoid obstacles such as is illustrated by a block 38.

The enjoyment or thrill of the racing installation is heightened by the steerability by having each of the trackways 12 and 14 so closely adjacent that each of the cars 16 and 18 (as is indicated by the size-indicating arrows 34—36) would collide if an attempt to pass a car is made without properly steering the passing car laterally outwardly of the axis of the trackway.

Obstacles such as the block 38 may be strategically placed along the layout to force each car to maneuver outwardly along that portion of the track 10, providing a specific location where passing clearance is assured, adding appeal to the layout if desired.

The steerability control will now be described, as shown in the drawings.

A control unit 40 for the separate remote control of each slot car is illustrated in FIG. 5, that happening to be the remote control unit (hand-held) for trackway 12 and thus for slot car 16. The control unit 40 of FIG. 5 illustrates both a manually operable throttle or speed control 42 and a manually operable steering wheel or steering control 44.

These manual controls 42 and 44 are shown as respectively operative to control the resistance of variable resistors 46 and 48 respectively, the circuitry of which is described hereinafter.

The speed and steering control, manually applied to the system through the manual controls 42 and 44 of control unit 40 just mentioned, is then transmitted (through a power box or circuitry 50, FIG. 6, detailed below) to the trackway 12 to thereby control the speed and steering of slot car 16 by control of the electrical energization of the trackway 12 for that particular slot car 16.

The trackways 12 and 14 of the illustrative embodiment are shown as being of four-groove type, that is, each has four elongated electrical conductors 52 which are insulatedly spaced from one another, as by the track 10 itself being of electrically nonconducting material.

Each of the four conductors 52a is illustrated in FIG. 3 as being of flat strip nature, and the four conductors 52b FIG. 4 are illustrated as being of a general U-shaped nature or configuration. Each of the conductors 52 is electrically continuous, over the entire track 10 layout; and each is adapted to supply controlled electrical energy to the respective cars 16—18 as now described in the illustrated embodiment through movable conductor bars or strips 54.

The conductor bars 54 are schematically shown as having an elongated generally horizontal portion 56, and have a downturned rear end 58 each adapted to conductingly although movably engage the respective track element 52, and an upturned front end 60 which extends into a car-carried terminal box 62 into which those front connector ends 60 are received. In that box or block 62, the connector ends 60 are movably connected to electrical terminals of circuitry, as described below, for energizing both drive or propulsion means for the slot car and steering control means for the slot car.

A springlike or resilient material is desirably used for the body of each of the connector bars 54, assuring sufficiently good electrical contact thereof with the trackway conductor elements 52 even though that is of course a moving contact. Desirably, the connector bars 54 are either insulatedly coated or have some means of limiting the outward car swinging, to prevent shorting across two conductor bars 54 during wide car-swinging maneuvers.

As shown in FIG. 4, the extreme lower ends of the rear end portions 58 of conductor bars 54 are shown as formed outwardly somewhat, schematically representing carbon brushes or other sliding contact members, although the fit of those connector ends 58 inside the trackway grooves 64 of the trackways 12–14 of course has to be free enough to permit the desired relative movement thereof.

The grooves 64, into which the track conductor strips 52 (52a, 52b, or otherwise) are recessed, are desirably deep enough as to assure the retention of the end 58 of each connector bar 54 therein during both forward and lateral movement of the respective slot car.

In the illustrative embodiment, outward swinging of each of the slot cars 16—18 is limited by the length and any mobility limits of the electrical connector bars 54; although, if preferred, other limiting stops or abutments may be utilized. Alternatively, however, perhaps it may be desired to not positively limit the outward car swinging by any means, and even employ very shallow track grooves 64, and thus require more operational skill and technique in avoiding such a wide car swinging as would cause the control connectors 54 to leave the track grooves 64 altogether.

For more particular details of the steering control features, in the embodiment as shown it will be observed in FIG. 6 (the power box or control circuitry 50) that there is provided a self-balancing bridge circuit with complementary symmetry amplification of the bridge current.

More specifically in the form shown, there is provided an NPN transistor 70 and a PNP transistor 72, the respective base leads 74 and 76 to the base 78 of each of which are in parallel (as by interconnecting line 77) in each of the two symmetric circuits. There is a power supply 80 and a load (power-limiting) resistor 82 in series with each base lead 74–76.

The collectors 84 as shown are connected respectively to output power batteries 86. Those power sources 86 are connected together as by line 88. A line 90 interconnects, in parallel, the emitters 92 of the two transistors 70–72.

Separate from the base-lead-connecting circuit 77, and from the collector-connecting circuit 88 and from the emitter-connecting circuit 90, a drive motor battery or power source 94 (for vehicle propulsion in contrast to vehicle steering) is provided in a circuit 96 in the power box unit 50.

Interconnecting the control unit 40 and the power unit 50 are three wires 100, 102, and 104, desirably provided in an elongated flexible cord, permitting the user to hold the control unit 42 in his hand.

The right (FIG. 6) end of those connecting leads are respectively connected as follows: Wire 100 to the base circuit 77; wire 102 in parallel to both emitters 92; and wire 104 to the drive power circuit 96.

Those wires are connected to the control unit (FIG. 5) as follows: Wire 100 through circuit 106 to one terminal of the steering control resistor 48; wire 102 through a circuit 108 to the other terminal of that steering control resistor 48 and also to one terminal of the speed control resistor 46, which are thus in parallel; and wire 104 through a circuit 110 to the other terminal of that speed control resistor.

Turning again to FIG. 6, the right end of the control box 50 is shown as having four terminals, to which are connected the four control wires or circuits as follows: A wire 112 which through a connector wire 114 is connected to the collector circuit 88 in parallel with both collectors 84; a wire is 116 connected to the base lead circuit 77 in parallel with both base leads 74–76; a wire 118 in parallel with both emitters 92; and a wire is 120 connected to the drive power source circuit 96.

Connection of the control wiring (112, 116, 118, and 120) to the trackway 12 (or 14) and more specifically to the conductor strips 52 thereof, is shown (FIGS. 6 and FIG. 1) as follows:

a. Wire 112 through a track strip 122 to the connector bar 54a which leads by wire 124 to a terminal (of the vehicle's terminal block 62) which is connected to one terminal of the vehicle's steering motor 126;

b. Wire 116 through track strip 128 to the connector bar 54b which leads to a terminal (of car block 62) which is connected by wire 130 one terminal of a steering control potentiometer 132 carried by the car;

c. Wire 118 through a track strip 134 to the connector bar 54c which leads to a terminal (of car block 62) which is shown connected by wire 136 to and by parallel branches 138, 140 and 142 to one side or terminal of the vehicle's drive motor 144 and to the sides or terminals of the vehicle's steering potentiometer 132 and steering motor 126 opposite the side or terminal already mentioned as connected to leads 130 and 124 respectively;

d. Wire 120 through a track strip 146 to the connector bar 54d which leads to a terminal (of car block 62) which is shown connected by a wire 148 to the opposite side or terminal of the vehicle's drive motor 144 other than that connected or grounded to wire 138 of the common circuit 136.

It will, accordingly be seen that the user's actuation or turning of the manual steering control wheel 44 of the control unit 40 is effective (through track strips 122 and 134, connector bars 54a and 54c and leads 124 and 140) to cause the car's steering control motor 126 to correspondingly turn the car's steering linkage 20 (via steering motor pinion 150, steering gear 152, steering pinion 154, and linkage sector rack 156) to cause the car's front wheels 22 to turn, in correspondency to the setting manually imparted to the control wheel 44.

The car's steering motor 126 will continue to keep turning the car's wheels 22, continuing to approach the controlled setting imparted manually to the control wheel 44, until the car's steering pinion 154 has also turned the drive gear 158 of the car's steering control potentiometer 132 and amount such that the effective resistance of that steering control potentiometer 132 stops current flow in the collector circuit 88 which controls energization of the car's steering motor 126.

In analyzing the operativity of the circuitry and other concepts shown, it will be observed that the current $I_c$, which is in line 112 of the output circuit of transistors 70 and 72 and which powers the steering motor 126, may be shown algebraically as follows:

Equation 1:

$$I_c = \frac{\beta E(R_1 - R_2)}{R_b(R_2 + R_1) + R_2 R_1}$$

Where:

$\beta$ is the current gain of the transistors, $E$ is the voltage source 86, $R_2$ is the feedback resistance 132, $R_1$ is the control resistance 48, and $R_b$ is the base 78 resistance of the transistors;

But since $R_2 \alpha \theta_2$ and thus $dR_2/dt \alpha d\theta_2/dt$ (mechanical linkage), and since $I_c \alpha dR_2/dt$ (electric motor and mechanical linkage characteristics), it is seen also that $I_c \alpha d\theta_2/dt$. Also, similarly, $R_1 \alpha \theta_1$.

Thus, the analysis of the linear mechanical linkage and electric motor characteristics with Equation 1 yields the following, for the time derivative or rate of change of the front wheel steering angle with respect to time:

Equation 2:

$$d\theta_2/dt = K(\theta_1 - 74_2)$$

Where:

$\theta_2$ is the front wheel steering angle, $\theta_1$ is the steering wheel angle, and $K$ is a relatively constant function of $\theta_1$ and $\theta_2$.

Accordingly, it is seen that the controlled front wheel angle is always approaching the controlling steering wheel angle, approaching it fastest when it is farthest away. This gives exceedingly fast responsiveness of control.

In the disclosed from or embodiment, values and ratings of the various components include the following:

Manual throttle or car speed variable resistor 46 (in control unit 40): 10 ohm;

Manual steering control variable resistor 48 (in control unit 40): 500 ohm;

Vehicle-carried steering control potentiometer 132: 500 ohm;

Load-limiting resistors 82: 50 ohm;

Bridge circuit batteries 80: 20 volt;

Output power batteries 86: 6 volt;

Drive motor battery 94: 12 volt;

(Batteries may be replaced by a two transformer AC converter if desired.)

Transistors 70 (NPN) and 72 (PNP): 5 watt.

It is thus seen that the concepts of the steerable slot car control means provide an advantageous and appealing slot car layout, the steerability of the vehicles hereby achieved providing operating advantages and appeal surpassing that of just speed-controllable slot car layouts and systems.

The layout is relatively inexpensive, reliable, and compact. Linearity of positioning is very high, as is desirable for ease of controlling the speeding vehicle in various steering situations, thus providing in effect a constant steering ratio, by which a certain manual steering turn magnitude of the wheel 44 will yield the same magnitude output responsiveness of the controlled steering motor 126 and the vehicle's steerable wheels 22 as that same steering turn magnitude will yield at other settings of the steering control 44. Responsiveness of control is extremely quick and positive, enabling the user's manual steering maneuver to be effectively instantly both sensed and manifested by the vehicle's steering control and the vehicle's steerable wheels 22. Resolution, which is the "lost motion" effect of a minute turn of the manual steering wheel 44 without an effective output response of the steering motor 126, is effectively negligible, being less than two degrees for the circuitry and components which are disclosed herein for illustrating the inventive concepts.

Accordingly, it will thus be seen from the foregoing description of the invention according to this illustrative embodiment, considered with the accompanying drawings, that the present invention provides a new and useful steering control means for slot cars, having desired advantages and characteristics, and accomplishing its intended objects, including those hereinbefore pointed out and others which are inherent in the invention.

Modifications and variations may be effected without departing from the scope of the novel concepts of the invention; accordingly, the invention is not limited to the specific form or arrangement of parts herein described or shown.

WHAT IS CLAIMED IS:

1. A steering control system for a vehicular track and vehicle system, including a trackway providing a designated nominal pathway for motion of the associated electrically-powered vehicle, said trackway being of a type which provides an electrical conductor means adapted to be conductingly engaged therealong, and including one or more vehicles having steering means and adapted to travel along said trackway, said steering control system for each said vehicle comprising:

electrically conductive means movably and conductingly engageable with said trackway;

a trackway system comprising at least three elongated electrical conductors extending along the trackway;

electrically operable steering control means carried by the vehicle and controlling said vehicle steering means;

a manually operable steering control means not carried by the vehicle, and having variable electric means responsive to the setting of said manually operable steering control means;

circuitry connecting said variable electric means to the said trackway;

said circuitry being such as to provide that a particular setting of said manually operable steering control means and thus of the associated variable electric means will energize said vehicle-carried electrically operable steering control means to correspondingly set the position of the vehicle's steering means.

2. The invention as set forth in claim 1 in a combination in which the trackway system comprises at least four of the elongated electrical conductors, three of the conductors being cooperatively associated in the overall circuitry to provide the said control of said electrically operable steering control means.

3. The control system as set forth in claim 1 in a combination in which the electric circuitry for said steering control means includes a self-balancing bridge circuit with complementary symmetry amplification of the bridge current.

4. The control system set forth in claim 2 in a combination in which the fourth of said conductors and one of said three above-designated conductors are cooperatively associated in the overall circuitry to provide the electrical energization of the vehicle drive means.

5. The invention as set forth in claim 1 in a combination in which the electrically operable steering control means carried by the vehicle includes a movable steering control component, the steering control means including moving means which cause said component to move as an incident to the steering movement of the vehicle steering, the said movable steering control component being operative to deenergize said steering control means when moved an amount operatively related to the amount of steering control movement imparted to said manually operable steering control means.

6. The invention as set forth in claim 5 in a combination in which there is variable electric means carried by the vehicle and responsive to movement of said movable steering control component, and the deenergization of the said steering control means is operative by operative correspondency of the operative setting of the said variable electric means which is carried by the vehicle and the variable electric means which is not carried by the vehicle.

7. The invention as set forth in claim 1 in a combination in which there is provided at least two of said vehicles and at least two trackway systems, each said trackway system being operatively separate from the other and having a separate steering control means operative through its said trackway system to provide vehicle-steering control for its associated vehicle, the steerability providing that the vehicles may be steered laterally of said designated nominal pathway.

8. The invention as set forth in claim 7 in a combination in which the said trackways are physically so closely spaced as to require a vehicle-steering effort to be imparted to the passing vehicle by the said manually operable steering control means to enable said passing vehicle to clear the vehicle being passed.

9. The invention as set forth in claim 1 in a combination in which there are provided obstacle means associated with the said designated nominal pathway of said trackway which require a vehicle-steering effort to be imparted to said vehicle by the said manually operable steering control means to enable said vehicle to pass said obstacle means.

UNITED STATES PATENT OFFICE
CERTIFICATE OF CORRECTION

Patent No. 3,601,400                           Dated  August 24, 1971

Inventor(s)  Patrick W. Boles

It is certified that error appears in the above-identified patent and that said Letters Patent are hereby corrected as shown below:

Column 4, line 27, "and" should read -- an --; lines 46, both occurrences, 47, 48 and 49, "a", each occurrence, should read -- $\alpha$ --. Column 4, line 55, "$74_2$" should read -- $\theta_2$ --.

Signed and sealed this 12th day of December 1972.

(SEAL)
Attest:

EDWARD M. FLETCHER, JR.
Attesting Officer

ROBERT GOTTSCHALK
Commissioner of Patents